United States Patent
Accary et al.

(10) Patent No.: US 10,156,152 B2
(45) Date of Patent: Dec. 18, 2018

(54) NUT FOR AXIALLY LOCKING A BEARING RING IN A TURBOMACHINE

(71) Applicant: SAFRAN AIRCRAFT ENGINES, Paris (FR)

(72) Inventors: Arnaud Michel Marie Accary, Moissy-Cramayel (FR); Alexandre Michel Henri Hasquenoph, Moissy-Cramayel (FR); Frédéric David Stéphane Rogues, Moissy-Cramayel (FR); Régis Eugène Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/549,354

(22) PCT Filed: Feb. 9, 2016

(86) PCT No.: PCT/FR2016/050273
§ 371 (c)(1),
(2) Date: Aug. 7, 2017

(87) PCT Pub. No.: WO2016/128663
PCT Pub. Date: Aug. 18, 2016

(65) Prior Publication Data
US 2018/0016929 A1    Jan. 18, 2018

(30) Foreign Application Priority Data
Feb. 10, 2015 (FR) ..................... 15 51086

(51) Int. Cl.
*F16B 39/10* (2006.01)
*F01D 11/02* (2006.01)
(Continued)

(52) U.S. Cl.
CPC .............. *F01D 11/02* (2013.01); *F01D 25/00* (2013.01); *F01D 25/162* (2013.01);
(Continued)

(58) Field of Classification Search
CPC ...... F16B 39/10; F16B 43/001; F16B 43/004; F01D 11/02; F01D 25/00; F01D 25/162; F01D 25/183; F02C 7/00
(Continued)

(56) References Cited

U.S. PATENT DOCUMENTS 3,915,523 A    10/1975  Shank
5,618,143 A *   4/1997  Cronin, II ............... B25B 13/48
                                                    411/120
(Continued)

OTHER PUBLICATIONS

Written Opinion of the International Searching Authority dated May 18, 2016, issued in corresponding International Application No. PCT/FR2016/050273, filed Feb. 9, 2016, 4 pages.
(Continued)

*Primary Examiner* — Roberta S Delisle
(74) *Attorney, Agent, or Firm* — Christensen O'Connor Johnson Kindness PLLC

(57) ABSTRACT

A nut for a turbine engine, in particular for axially locking a bearing race. The nut comprises a thread for screwing onto a part of the turbine engine, and a lock for ensuring the nut cannot rotate relative to the engine part. The nut further comprises at least one dynamic seal.

11 Claims, 3 Drawing Sheets

(51) Int. Cl.
*F01D 25/00* (2006.01)
*F01D 25/16* (2006.01)
*F02C 7/00* (2006.01)
*F01D 25/18* (2006.01)
*F16B 33/00* (2006.01)

(52) U.S. Cl.
CPC .............. *F01D 25/183* (2013.01); *F02C 7/00* (2013.01); *F16B 39/10* (2013.01); *F05D 2250/75* (2013.01); *F05D 2260/31* (2013.01); *F16B 33/004* (2013.01)

(58) Field of Classification Search
USPC .................................. 411/369, 427, 517, 542
See application file for complete search history.

(56) References Cited

U.S. PATENT DOCUMENTS

| | | | | |
|---|---|---|---|---|
| 5,772,373 | A * | 6/1998 | Cronin, II | B25B 13/48 411/120 |
| 6,151,881 | A * | 11/2000 | Ai | F01D 5/081 415/115 |
| 6,976,816 | B2 * | 12/2005 | Slesinski | F16B 39/103 411/120 |
| 8,292,373 | B2 * | 10/2012 | Rieger | B60B 27/0005 301/105.1 |
| 8,469,460 | B2 * | 6/2013 | Martin, III | B60B 37/10 301/105.1 |
| 9,121,435 | B2 * | 9/2015 | Gignoux | F16B 39/10 |
| 9,599,143 | B2 * | 3/2017 | Ekmedži | F16B 39/108 |
| 2014/0369784 | A1 * | 12/2014 | Lagarde | F01D 25/16 411/81 |

OTHER PUBLICATIONS

International Preliminary Report on Patentability dated Aug. 2017, issued in corresponding International Application No. PCT/FR2016/050273, filed Feb. 9, 2016, 1 page.
International Search Report dated May 18, 2016, issued in corresponding International Application No. PCT/FR2016/050273, filed Feb. 9, 2016, 2 pages.
Written Opinion of the International Searching Authority dated May 18, 2016, issued in corresponding International Application No. PCT/FR2016/050273, filed Feb. 9, 2016, 5 pages.

* cited by examiner

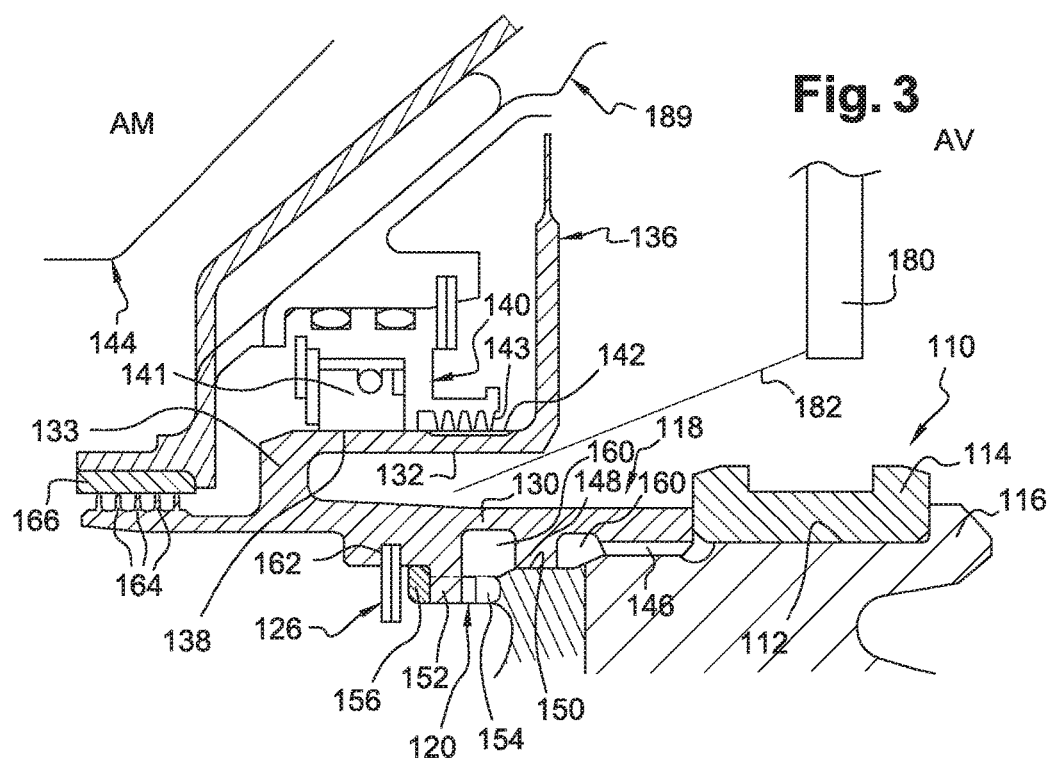
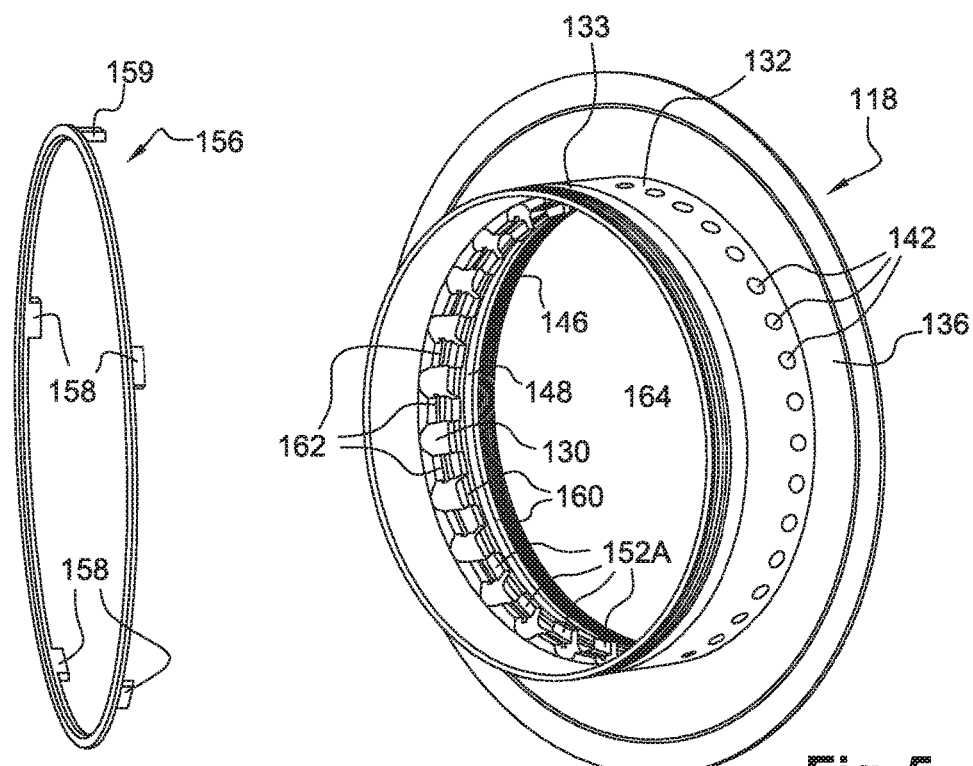

NUT FOR AXIALLY LOCKING A BEARING RING IN A TURBOMACHINE

TECHNICAL FIELD

The present invention relates to a nut for a turbine engine, in particular for axially locking a bearing race.

PRIOR ART

The prior art comprises in particular U.S. Pat. Nos. 3,915,523, 6,142,729, US-A1-2006/251512, US-A1-2003/044097 and US-A1-2009/034896.

A turbine engine comprises bearings for guiding and centring parts such as shafts. Bearings of the anti-friction type comprise two races, which are inner and outer respectively, between which the anti-friction bearings are located, such as ball bearings or rollers, which can be held at a distance from one another by an annular cage interposed between the races.

As can be seen from FIG. 1, which is extracted from the previous application FR-A1-2 976 623 by the applicant, each bearing 10 is generally mounted on a turbine engine shaft (or an element supported by the shaft) by axially sliding on a cylindrical surface 12 of the shaft, until the inner race 14 thereof is axially supported against an annular shoulder 16 of the shaft. The inner race 14 is then axially locked against the shoulder 16 by means of a nut 18 which is screwed onto the shaft and of which one end is axially supported on the inner race 14. The outer race 15 of each bearing 10 is generally attached to a bearing support 17, 19, said support in this case acting as a cage interposed between the races.

It is known to combine locking means 20 with a nut in order to ensure said nut cannot rotate relative to the shaft on which it is mounted, as can also be seen from FIG. 1.

In the context of the present invention, the environment denoted by reference sign A in FIG. 1 and shown in an enlarged view in FIG. 2 is of particular interest (although the technologies shown in FIGS. 1 and 2 are different).

Said FIG. 2 shows that the above-mentioned locking means 20 of the nut 18 are located at the end thereof which is located on the side opposite the bearing 10. Said locking means 20 comprise an axial cylindrical rim which comprises an annular row of radial recesses defining axial teeth therebetween. Said locking means 20 are radially aligned with similar locking means 22 of the shaft. A locking ring 24 is applied to the locking means 20, 22 and comprises radial lugs which are inserted between the teeth of said locking means to ensure that the nut cannot rotate relative to the shaft. The locking ring 24 is applied to the locking means 20, 22 by axial translation and is held axially in a locking position by means of a circlip 26 which is supported axially on the ring 24 and which is inserted in a radially inner annular groove in the axial cylindrical rim of the means 20 for locking the nut.

In the prior art of the invention shown by FIG. 2, it is observed that the nut 18 is axially supported on the inner race 14 of the bearing 10 by means of a sealing member 28, commonly referred to as a "rotating labyrinth" in the aeronautical field. Said sealing member 28 comprises a portion having a U or C-shaped axial section of which the opening opens axially, in this case downstream (with reference to the flow of the gases in a turbine engine) and which comprises two substantially cylindrical annular walls, which are inner 30 and outer 32 respectively, extending one inside the other. The inner wall 30 comprises at the downstream end thereof an annular rim 34 which extends radially inwards and which is axially clamped between the nut 18 and the inner race 14 of the bearing 10. The outer wall 32 is connected by the downstream end thereof to a radial annular wall 36 extending outwards and forming a deflector or drop-launcher. The outer wall 32 and the radial wall 36 are surrounded by a portion of a chamber cowling 89, a dynamic sealing system 40 being mounted between the outer wall 32 and the chamber cowling 89. In the present application, dynamic sealing is understood to mean sealing produced between two parts which are movable relative to one another, in particular rotatably movable. The outer wall 32 of the member comprises a sealing means 38 formed by a cylindrical surface provided with a coating which is intended to harden the surface and improve the coefficient of friction which cooperates with the elements 41 which are part of the sealing system 40. Said sealing system 40 is supplemented by a twist 43 which engages with axial grooves 42 carried by the outer wall 32 in order to protect the sealing system 40 from pollution by the oil which could reach it, more particularly the oil used to lubricate the bearing 10. The rubbing of the elements 41 on the sealing means 38 generates heat, requiring cooling of the outer wall 32. Said cooling is produced by a jet of oil 82 coming from an oil-spraying nozzle 80 directed inside the U or C-shaped axial section of the sealing member 28.

Furthermore, as can be seen from FIG. 2, a portion of the chamber cowling 89 is surrounded by a portion of the fan rotor of the turbine engine, and in particular by a fan disc 44.

It has been observed in the event, which is fortunately infrequent, of degradation or rupture of a fan blade, that there is a risk of contact with substantial force between the chamber cowling 89 and the fan disc 44. One solution to this problem would consist in increasing the clearances between these parts. However, as the fan disc 44 cannot be modified easily (in particular because of sizing problems), and the bearing 10 cannot be moved easily (in particular due to the lack of flexibility of the engine architecture), another solution must be considered.

The present invention proposes a simple, effective and economical solution to this problem.

SUMMARY OF THE INVENTION

For this purpose, the invention proposes a nut for a turbine engine, in particular for axially locking a bearing race, the nut comprising a thread for screwing onto a part of the turbine engine, and locking means for ensuring the nut cannot rotate relative to said part, the nut further comprising at least one dynamic sealing means, characterised in that it comprises a part having a substantially C or U-shaped axial section of which the opening is oriented axially, said part comprising two substantially cylindrical walls, which are inner and outer respectively, said thread being located on the inner cylindrical wall, and said dynamic sealing means being located on the outer cylindrical wall.

The invention thus proposes integrating in the nut the functions of the sealing member from the prior art. In other words, the invention proposes combining the assembly formed by the nut and the sealing member from the prior art into one and the same element. This combination makes it possible in particular to reduce the bulk, in particular the radial bulk, of said assembly by reducing the diameter thereof. This reduction of the bulk makes it possible to envisage increasing the axial clearance between the bearing support and the fan disc, in the particular case described above, and thus to limit the risk of contact between these parts in the event of rupture of a fan blade.

The nut according to the invention preferably comprises two independent dynamic sealing means.

The or each sealing means comprises for example a series of annular wipers, a sealing surface, a twist, crescent-shaped holes or grooves intended to improve the effectiveness of the twist, and/or an element of a labyrinth sealing joint.

The nut can comprise an outer radial wall forming for example a deflector, which is preferably designed to protect the dynamic sealing means.

According to a preferred embodiment of the invention, the nut comprises a portion having a substantially C or U-shaped axial section, of which the opening is oriented axially, and this can allow the cooling of the sealing means by a jet of oil. Said portion can comprise two substantially cylindrical walls, which are inner and outer respectively, said thread being located on the inner cylindrical wall, and at least one of the dynamic sealing means being located on the outer cylindrical wall. The outer radial wall of the nut can be located at a downstream end of said outer cylindrical wall.

Another dynamic sealing means is preferably located on an axial extension upstream of said inner cylindrical wall.

Advantageously, the nut comprises centring means, which are independent of said thread, and designed to engage with said part.

Preferably, the locking means comprise an inner radial rim which comprises axial recesses which are designed to receive axial lugs of a locking ring.

Advantageously, said opening is designed to define a cooling cavity, in particular by the impact of oil on at least one of the walls thereof.

The present invention further relates to a turbine engine, comprising a part, such as a shaft, carrying a bearing race which is axially locked by a nut of the type described above.

The turbine engine preferably comprises at least one oil-spraying nozzle which is designed to project oil into said opening of the nut.

DESCRIPTION OF THE FIGURES

The invention will be better understood, and other details, features and advantages of the invention will become clearer upon reading the following description, given by way of non-limiting example and with reference to the accompanying drawings, in which:

FIG. 3 is a schematic axial sectional half view of a nut for axially locking a bearing race according to the invention, the nut comprising teeth interlocked with recesses in a shaft, FIG. 4 is a schematic perspective view of the locking ring from FIG. 3, FIG. 5 is a schematic perspective view of the nut from FIG. 3, and FIGS. 6 and 7 are other schematic views of the nut from FIG. 3.

DETAILED DESCRIPTION

Figure 1:
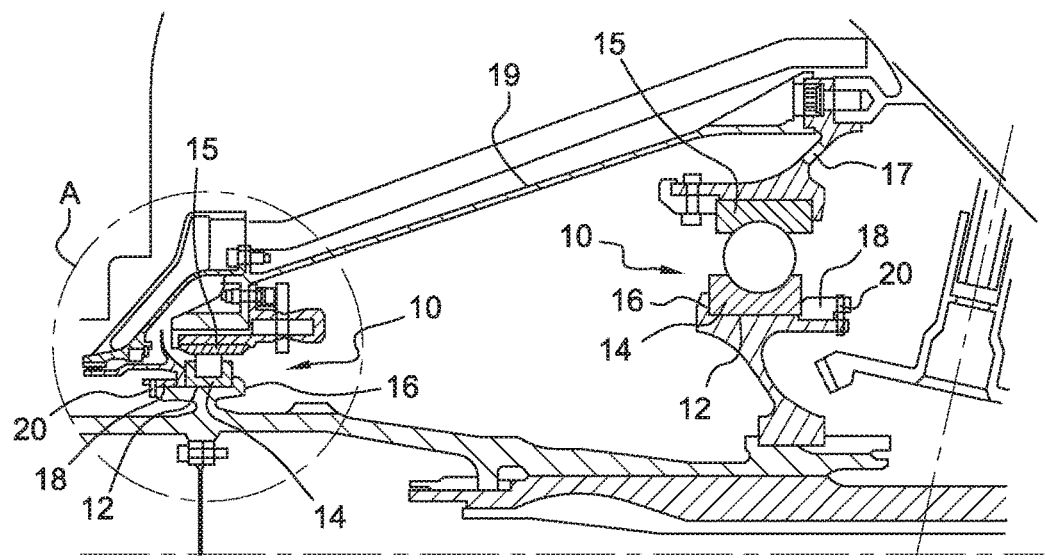
FIG. 1 is a schematic axial sectional half view of a turbine engine according to the prior art.
Figure 2:
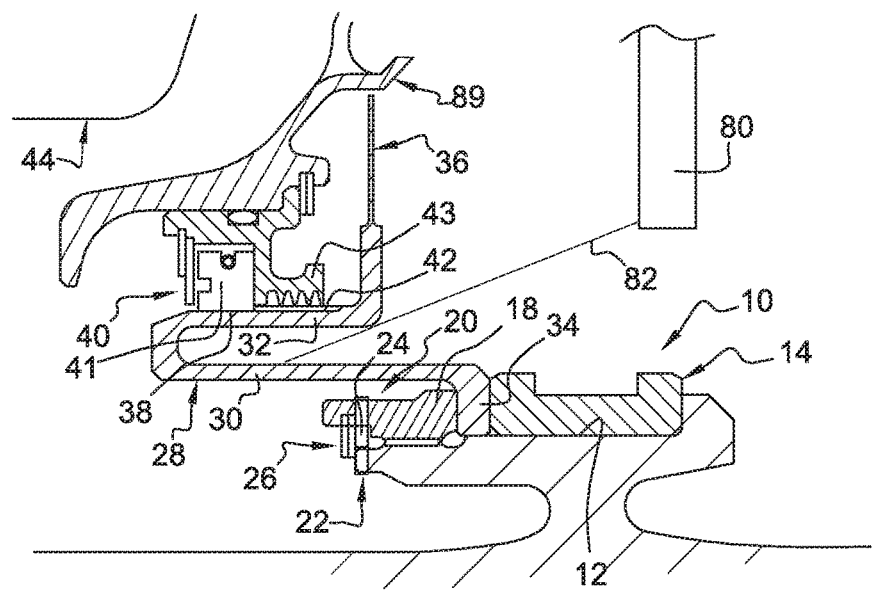
FIG. 2 is a schematic axial sectional half view of a nut for axially locking a bearing race and a sealing member according to the prior art.
Figure 6:
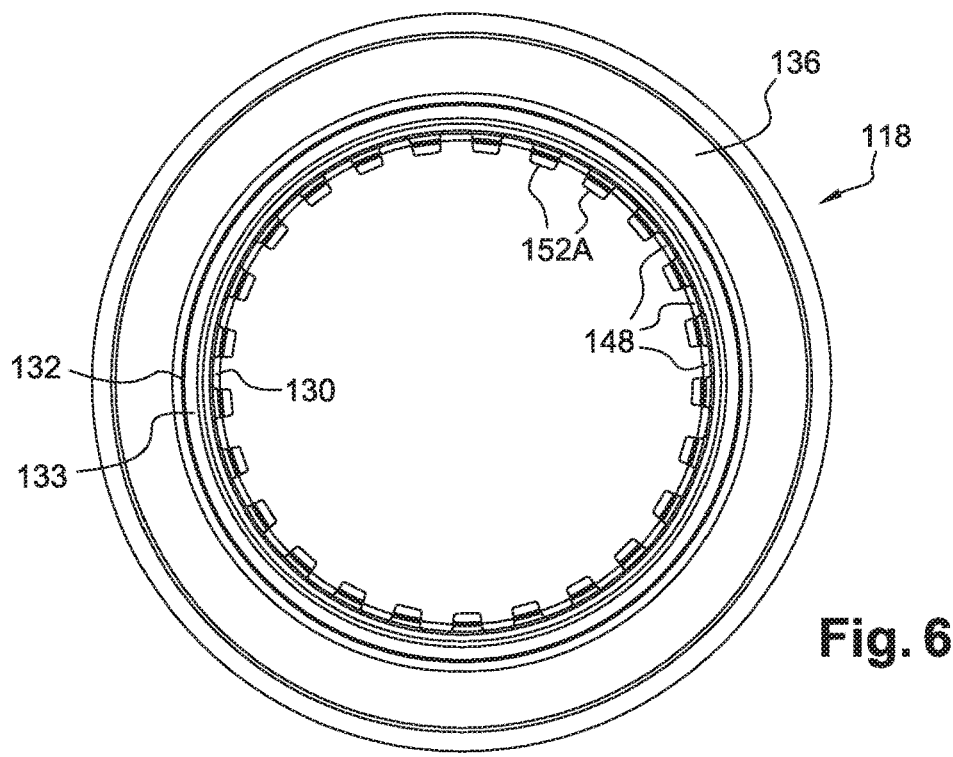
Figure 7:
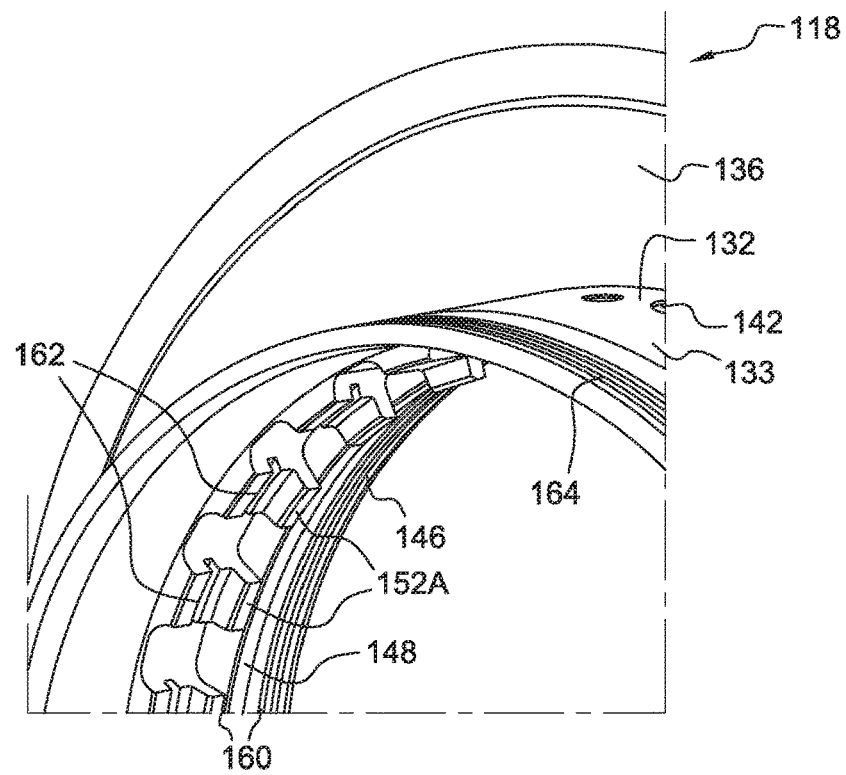

FIGS. 1 and 2 have been described above and show the art prior to the invention.

FIGS. 3 to 7 show an embodiment of a nut 118 for locking an inner race 114 of a turbine engine bearing 110. As described above with reference to FIGS. 1 and 2, the bearing 110 is mounted on a turbine engine shaft (or an element supported by the shaft) by axially sliding on a cylindrical surface 112 of the shaft, until the inner race 114 thereof is axially supported against an annular shoulder 116 of the shaft. The inner race 114 is then axially locked against the shoulder 116 by means of the nut 118 which is screwed onto the shaft and of which one end is axially supported on the inner race 114. The outer race of the bearing is not shown and is fixed to a chamber cowling 189.

The nut 118 is screwed from upstream (on the left in the drawing) onto the shaft and comprises an internal thread 146 which is designed to engage with a complementary external thread of the shaft, which is located directly upstream of the surface 112.

In the example shown, the nut 118 comprises a portion having a substantially U or C-shaped axial section of which the opening is oriented axially, in this case downstream (on the right in FIG. 3, indicated by AV). The nut 118 thus comprises two substantially cylindrical annular walls, which are inner 130 and outer 132 respectively, extending one inside the other. The walls 130, 132 are interconnected at the upstream ends thereof by a substantially radial wall 133.

The inner wall 130 comprises at the downstream end thereof the thread 146. It further comprises, upstream (towards the left in FIG. 3, indicated by the reference sign AM) of the thread 146, an annular rim 148 extending radially inwards. Said rim 148 is designed to engage with the shaft to form means for centring the nut 118. In this case, the rim 148 comprises a radially inner cylindrical surface which is intended to slide on a cylindrical surface 150 of the shaft. Said centring means can be important for ensuring the proper function of the sealing means which will be mentioned later.

The inner wall 130 further comprises, upstream of the rim 148, an annular rim 152 extending radially inwards. Said rim 152 comprises an annular row of axial recesses which are evenly distributed and which define radial teeth 152A therebetween. The rim 152 has an internal diameter which is smaller than that of the rim 148 in such a way that one of said recesses, in the position for assembly of the nut 118, is axially aligned with one of the axial recesses in the shaft. The axial teeth 154 of the shaft are formed in this case by an axial cylindrical rim of the shaft which extends upstream and comprises an annular row of radial recesses defining teeth 154 of the shaft therebetween. In the assembly position shown in FIG. 3, the radial teeth 152A of the rim 152 are located at a short axial distance from the recesses in the shaft, between which are located teeth 154. Said teeth form locking means 120 which cooperate with a locking ring 156 to ensure the nut 118 cannot rotate relative to the shaft.

The locking ring 156 can be seen more easily in FIG. 4. Said ring has a continuous shape over 360° and comprises axial lugs 158, and at least one longer axial lug 159, which extend downstream. Said lugs 158 and 159, the number of which is selected in a suitable manner, are evenly distributed around the axis of revolution of the ring 156. The ring 156 is translationally mounted from upstream onto the teeth of the rim 152 and the teeth 154 of the shaft, the lugs 158 and 159 of the ring being intended to be inserted between said teeth which can come into abutment in the circumferential direction on the circumferential ends of the lugs 158 and 159 to ensure the above-mentioned prohibition of rotation. Only the lug or lugs 159 are inserted in the recess or recesses in the shaft previously aligned with those of the nut 118. As can be seen from FIG. 3, the rims 148, 152 are separated from one another by a first annular groove 160 of the wall 130, which opens radially inwards, and the rim 148 and the thread 146 are separated from one another by a second annular groove 160 of the wall 130, which opens radially inwards.

The inner wall 130 further comprises, upstream of the rim 152, an annular groove 162 opening radially inwards and in which is mounted the outer periphery of an annular circlip 126 which can be axially supported on the ring 156 to axially retain said ring in the above-mentioned position for locking the nut 118. As can be seen from FIG. 5, said groove 162 is not continuous over 360° and is interrupted by the above-mentioned axial recesses in the rim 152, said recesses extending axially as far as the region in which the groove 162 is located. Said recesses can be designed to engage with a tool for screwing/unscrewing the nut 118, as will be described in the following.

The inner wall 130 of the nut 118 extends axially upstream, beyond the wall 133, and defines an upstream axial cylindrical rim which carries a first sealing means. Said first sealing means in this case is a series of outer annular wipers 164 which engage with a layer 166 of abradable material carried by the chamber cowling 189. The assembly comprising the wipers 164 and the abradable layer 166 forms a dynamic sealing system or joint, in this case of the labyrinth type.

The outer wall 132 is connected by the downstream end thereof to a radial wall 136 extending outwards and forming a deflector or drop-launcher. The outer wall 132 and the radial wall 136 are surrounded by the chamber cowling 189. The dynamic sealing system 140 is mounted between the outer wall 132 and the chamber cowling 189. Said system 140 comprises frictional elements 141 which cooperate with a surface or a sealing means 138 of the outer wall 132. The surface 138 is covered with a coating which is intended to harden said surface and improve the coefficient of friction with the frictional elements 141. The rubbing of the frictional elements 141 on the sealing means 138 generates heat, requiring cooling of the outer wall 132. Said cooling is produced by a jet of oil 182 coming from an oil-spraying nozzle 180 directed inside the U or C-shaped axial section of the sealing member.

The deflector formed by the wall 136 is installed to protect the dynamic sealing joints of the chamber of oil which is located downstream of the wall 136 and is necessary for lubricating the bearing 110, and ejected thereby in operation. Without said deflector, the sealing joints of the chamber would be saturated with oil and could no longer ensure the function thereof of ventilating the chamber.

Even if this protection would be insufficient, the sealing system 140 can be supplemented by a twist 143 which engages with axial grooves or crescent-shaped holes 142 in the outer wall 132 in order to protect the sealing system 140 from pollution by the oil from the chamber. The crescent-shaped holes or axial grooves are intended to improve the effectiveness of the twist 143.

Furthermore, as can be seen from FIG. 3, a portion of the chamber cowling 189 is surrounded by a portion of the fan rotor of the turbine engine, and in particular by a fan disc 144.

The invention thus proposes integrating the sealing member from the prior art in the nut 118, which thus comprises a plurality of functions: screwing onto the shaft and axially stopping the inner bearing race 114, centring on the shaft by means of the rim 148, locking in rotation relative to the shaft by means of the teeth of the rim 152 and the ring 156, dynamic sealing, in this case with the wipers 164, of the sealing means 138, and lastly protecting dynamic sealing joints with the axial grooves or crescent-shaped holes 142 and the deflector formed by the radial wall 136.

In relation to the prior art shown in FIG. 2, the nut 118 has a smaller diameter. This is made possible in particular by eliminating the rim 34 from the prior art and by connecting the inner wall 30 of the member to the upstream end of the nut 18.

The nut 118 according to the invention can be mounted in the following manner. The bearing 110 is mounted on the shaft by axially sliding the inner race thereof, from upstream, on the cylindrical surface 112 of the shaft. The nut 118 is axially aligned with respect to the shaft and arranged upstream of the bearing 110. Said nut is translationally moved downstream along the axis of the shaft until the thread 146 thereof is located at the start/upstream of the thread of the shaft. A suitable tool is then used to rotate the nut and screw it onto the shaft. Said tool can be engaged on the nut 118 in the region of the rim 152, the tool being able to comprise axial teeth inserted in the above-mentioned axial recesses in said rim 152. The screwing is continued until the nut 118 is axially supported on the inner race 114 which is then clamped between the nut 118 and the shoulder 116 of the shaft. Over-torque is applied to the nut 118 in order to align at least one of the recesses therein with at least one recess in the shaft. The locking ring 156 is axially aligned with respect to the shaft and arranged upstream of the nut 118. It is translationally moved downstream along the axis of the shaft until the lugs 158 thereof are inserted between the teeth of the rim 152 and the longer lug or lugs 159 are inserted between the previously aligned rims 152 and teeth 154 of the shaft. The annular circlip 126 is then mounted in the groove to axially retain the ring 154 in the position thereof for locking the nut 118. For this purpose, the circlip 126 can be resiliently constrained in order to reduce the external diameter thereof until it can be inserted inside the nut and in the groove 162. The force applied to the circlip 126 is then nullified so that it can regain the original shape thereof, by resilient recovery, in the groove 162. The chamber cowling 189 can then be mounted around the nut 118 in such a way that the wipers 164 are aligned with the abradable layer 166 and that the sealing element 138 is aligned with the frictional elements 141.

Advantageously, the nut 118 combines a plurality of functions such as fixing and sealing by allowing gains in terms of compactness and ease of assembly when faced with the architectural constraints in the turbine engine.

The invention claimed is:

1. A nut for a turbine engine, the nut comprising;
   a thread configured to screw onto a part of the turbine engine,
   locking means for ensuring the nut cannot rotate relative to said part;
   at least one dynamic sealing means,
   wherein said nut comprises a portion having a C or U-shaped axial section of which the opening is oriented axially, said nut comprising inner and outer cylindrical walls, said thread being located on the inner cylindrical wall, and said dynamic sealing means being located on the outer cylindrical wall.

2. The nut according to claim 1, comprising two independent dynamic sealing means.

3. The nut according to claim 1, wherein the sealing means comprises a series of annular wipers, crescent-shaped holes, a sealing surface, a twist and/or an element of a labyrinth sealing joint.

4. The nut according to claim 1, comprising an outer radial wall which forms a deflector.

5. The nut according to claim 4, wherein said outer radial wall is located at a downstream end of said outer substantially cylindrical wall.

6. The nut according to claim 1, wherein another dynamic sealing means is located on an axial extension upstream of said inner substantially cylindrical wall.

7. The nut according to claim 1, comprising centring means, independent of said thread, and designed to engage with said part.

8. The nut according to claim 1, wherein said locking means comprise an inner radial rim which comprises axial recesses which are designed to receive axial lugs of a locking ring.

9. The nut according to claim 1, wherein said opening is designed to define a cooling cavity.

10. A turbine engine, comprising a part carrying a bearing race which is axially locked by a nut according to claim 1.

11. The turbine engine according to claim 10, further comprising at least one oil-spraying nozzle which is designed to project oil into said opening of the nut.

* * * * *